CHARLES WHITUS.
Improvement in Bit Braces.

No. 125,642.                               Patented April 9, 1872.

Witnesses:
L. Phlegen
Wm. Martin

Inventor
Charles Whitus 125,642

UNITED STATES PATENT OFFICE.

CHARLES WHITUS, OF PHILADELPHIA, PENNSYLVANIA, ASSIGNOR TO HIMSELF, EDWARD C. SMITH, AND WILLIAM MARTIN, JR., OF SAME PLACE.

IMPROVEMENT IN BIT-BRACES.

Specification forming part of Letters Patent No. 125,642, dated April 9, 1872.

Specification of Improvements in Brace and Bits, invented by CHARLES WHITUS, of the city of Philadelphia, in the State of Pennsylvania.

It is customary with persons who use implements of the character mentioned to keep a large number of wooden tubes, of different bores and lengths, to suit the various sizes of bits employed and to gauge the various depths of the holes intended to be bored. My invention is intended to supersede the use of such appliances; and it consists, first, in attaching to the forearm of the brace a gauge so constructed as to be adapted without change to bits of all sizes and shapes; second, in a combination with the gauge of a device to prevent spreading of the gauge when the bit is in use.

Figure 1:
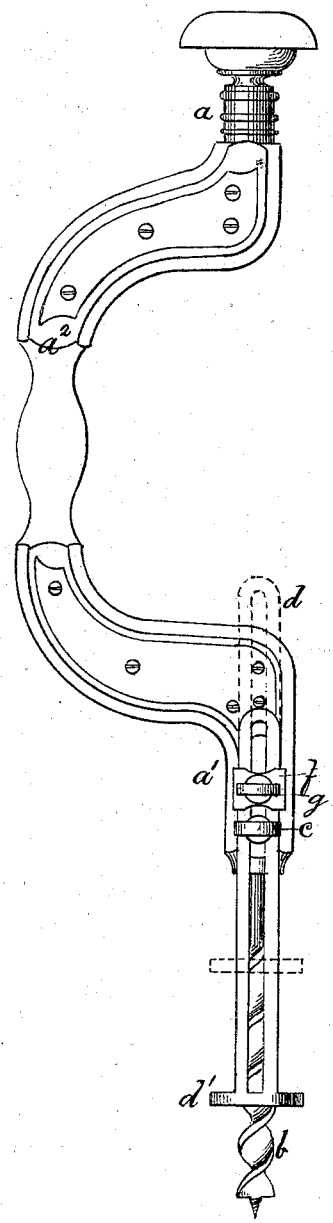
Figure 2:
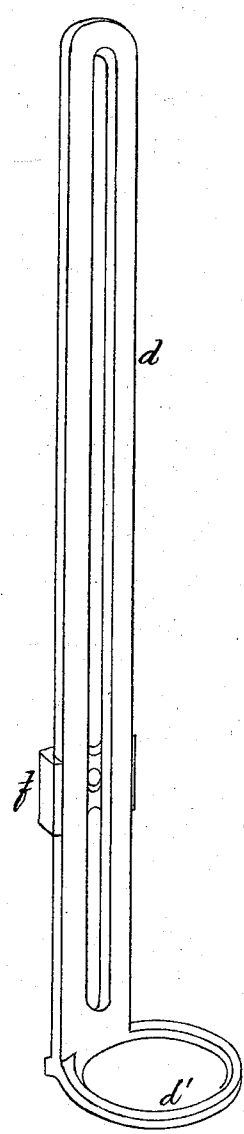
Figure 3:
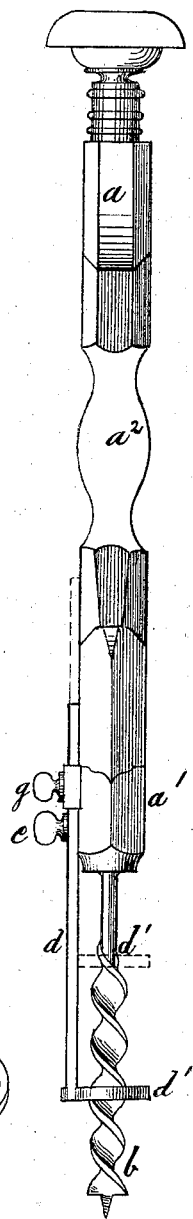

In the drawing, Figure 1 is a side elevation of a brace and bit embodying my improvements; Fig. 2, a perspective of the gauge detached; Fig. 3, an edge elevation of the implement as represented in Fig. 1.

$a$ represents the brace, the forearm of which is marked $a^1$. $b$ represents a bit, the shank of which enters a socket in the forearm $a^1$ in the usual manner, and is rigidly held by the thumb-screw $c$, which works through the slot in the gauge $d$. The gauge $d$ has a ring-shaped foot, $d'$, and is provided with a washer, $f$, which clasps the two edges of the gauge, as shown, and prevents the gauge from spreading as the bit enters the wood, and the foot of the gauge comes into frictional contact with the surface of the wood bored. The gauge $d$ slides under the washer $f$, and is attached to the forearm $a^1$ of the brace, and is adjusted for different depths of boring by means of the thumb-screw $g$. It is to be observed that I lengthen the crank $a^2$ and forearm $a^1$ sufficiently to allow the gauge $d$ to be moved up its whole length, or, in other words, until its foot $d'$ comes into contact with the end of the forearm $a^1$, without occasioning any interference with the arm of an operator employed in turning the crank. I prefer that the foot $d'$ should be a little less than square with the body of the gauge, as shown.

The gauge may be marked with lines to indicate inches and fractional parts of an inch.

I am aware that gauges have been long used in connection with bits; but, so far as I am informed, they have been attached directly to the bit, and have been of such a character that a different size of gauge has been required for each different size of bit employed.

I claim—

The gauge $d$, having a ring-shaped foot, $d'$, in combination with the washer $f$, thumb-screw $g$, and bit-stock or brace $a$, all constructed as shown, for the purpose specified.

CHARLES WHITUS.

Witnesses:
L. PHLEGEN,
WM. MARTIN, Jr.